(12) United States Patent
Sobko et al.

(10) Patent No.: US 8,051,485 B1
(45) Date of Patent: *Nov. 1, 2011

(54) SYSTEM AND METHOD FOR OPTIMIZATION OF ANTI-VIRUS SCAN

(75) Inventors: Andrey V. Sobko, Moscow (RU); Konstantin Y. Manurin, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 324 days.

This patent is subject to a terminal disclaimer.

(21) Appl. No.: 12/548,839

(22) Filed: Aug. 27, 2009

Related U.S. Application Data

(63) Continuation of application No. 12/416,543, filed on Apr. 1, 2009, now Pat. No. 7,591,019.

(51) Int. Cl.
*G06F 11/00* (2006.01)

(52) U.S. Cl. ............ 726/24; 726/22; 713/188; 719/321; 719/327; 711/118; 711/163; 707/2

(58) Field of Classification Search .................... 726/24; 713/188; 719/327
See application file for complete search history.

(56) References Cited

U.S. PATENT DOCUMENTS

| | | | |
|---|---|---|---|
| 5,668,991 A | 9/1997 | Dunn et al. | |
| 5,727,206 A | 3/1998 | Fish et al. | |
| 5,948,104 A * | 9/1999 | Gluck et al. | 726/24 |
| 6,098,079 A | 8/2000 | Howard | |
| 6,321,306 B1 | 11/2001 | Arimilli et al. | |
| 6,345,342 B1 | 2/2002 | Arimilli et al. | |
| 6,345,343 B1 | 2/2002 | Arimilli et al. | |
| 6,345,344 B1 | 2/2002 | Arimilli et al. | |
| 6,349,369 B1 | 2/2002 | Arimilli et al. | |
| 6,370,549 B1 | 4/2002 | Saxton | |
| 6,374,333 B1 | 4/2002 | Arimilli et al. | |
| 6,438,651 B1 | 8/2002 | Slane | |
| 6,594,732 B1 | 7/2003 | Sugiyama | |
| 6,609,177 B1 * | 8/2003 | Schlumberger et al. | 711/122 |
| 6,728,964 B1 * | 4/2004 | Butt | 719/313 |
| 6,842,861 B1 * | 1/2005 | Cox et al. | 713/188 |
| 6,845,430 B2 | 1/2005 | Hopeman et al. | |

(Continued)

FOREIGN PATENT DOCUMENTS

EP 0947932 2/1998

OTHER PUBLICATIONS

Scott et al.; Safe Virtual Execution Using Software Dynamic Translation; IEEE; 2002.

(Continued)

*Primary Examiner* — April Shan
(74) *Attorney, Agent, or Firm* — Bardmesser Law Group

(57) ABSTRACT

A system and method for optimizing a process of synchronization of a database of files checked by an anti-virus (AV) application implemented as a special AV driver. The database is updated by a special interface application using a log file and the AV driver cache. The AV driver monitors modifications of the files and records modification-related information in the context of the modified files. The AV driver creates and maintains a log of modified files. The AV driver supports a circular cache containing minimal required information about the modified files. This information is used for identification of the modified files by an application providing an interface between the AV driver and the database of checked files.

14 Claims, 12 Drawing Sheets

U.S. PATENT DOCUMENTS

| | | |
|---|---|---|
| 6,886,080 B1 | 4/2005 | Carey |
| 6,996,639 B2 | 2/2006 | Narad |
| 7,007,044 B1 | 2/2006 | Rafert et al. |
| 7,055,055 B1 * | 5/2006 | Schneider et al. .............. 714/6.1 |
| 7,062,515 B1 | 6/2006 | Thomas et al. |
| 7,072,916 B1 | 7/2006 | Lewis et al. |
| 7,286,891 B2 | 10/2007 | Chung et al. |
| 7,337,275 B2 | 2/2008 | Wolrich et al. |
| 2003/0229754 A1 | 12/2003 | Micka et al. |
| 2005/0005071 A1 | 1/2005 | Gammel et al. |
| 2006/0021032 A1 * | 1/2006 | Challener et al. ............... 726/22 |
| 2006/0109891 A1 | 5/2006 | Guo et al. |
| 2006/0294589 A1 | 12/2006 | Achanta |
| 2007/0136810 A1 | 6/2007 | Waltermann |
| 2007/0204130 A1 | 8/2007 | Hass et al. |
| 2007/0239789 A1 | 10/2007 | Bhat et al. |
| 2008/0005164 A1 | 1/2008 | Yee et al. |
| 2008/0232592 A1 * | 9/2008 | Lee et al. ...................... 380/277 |

OTHER PUBLICATIONS

Scott et al.; Strata: A Software Dynamic Translation Infrastructure; 2001.

* cited by examiner

SYSTEM AND METHOD FOR OPTIMIZATION OF ANTI-VIRUS SCAN

CROSS REFERENCE TO RELATED APPLICATIONS

This application is a continuation of U.S. patent application Ser. No. 12/416,543, filed Apr. 1, 2009, which is incorporated herein by reference in its entirety.

BACKGROUND OF THE INVENTION

1. Field of the Invention

The present invention is related to anti-malware technology, and more particularly, to a method and system for optimization of anti-virus scanning of a file system.

2. Description of the Related Art

Over a past decade malware components and viruses have become more sophisticated. They can access a lot of files of a computer system in a very short time. A file system of a computer system needs to be scanned by an anti-virus (AV) application in order to maintain file system objects intact if malicious programs attempt to change them. A separate task is a periodic scanning of the entire file system, when the AV typically scans hundreds of thousands of files. This is a lengthy and costly process.

Most of AV scanning methods are based on detection of file modifications. The log containing information related to file modifications is kept. AV references the modification log during AV scan of a computer system. This method is described in U.S. Patent Publication No. 2006/0294589, U.S. Patent Publication No. 2007/289019 and in U.S. Pat. No. 7,114,184.

Typically, the AV maintains a database of all the files checked by the AV.

Considering a number of files in a typical computer system, this database can be very large, especially in the case of file servers. Prior to scanning, the AV application has to query the database in order to know which files have already been checked and do not need to be checked again at this point. After scanning the files, the AV has to update the database.

Querying the database containing millions of records takes a long time and produces a significant computational overhead, due to database synchronization. Scanning some extra files causes additional load on the file system and slows down a computer system, especially on huge servers. It is also desirable to know which files (out of previously checked files) have been modified since the last AV scan.

Existing systems do not provide this information, and the AV performs a lot of unnecessary scanning of thousands of files. When the AV checks a file, it compares it against a database of known viruses. This database is also quite large and continuously grows larger. Thus, the comparison process takes extra time and imposes additional costs.

Accordingly, it is desirable to reduce a number of files that need to be checked using the AV signature database and to reduce overhead associated with AV processes.

SUMMARY OF THE INVENTION

The present invention is intended as a method and system for optimization of anti-virus (AV) scanning of a file system that substantially obviates one or several of the disadvantages of the related art.

In one aspect of the invention there is provided a system and method for optimizing a process of synchronization of a database of files checked by an anti-virus application (which can intercept a file access request). The database is maintained current by maintaining a log file of the files modified since a last file system scan. The database is updated by a special interface application using a log file and the AV driver cache.

The AV driver monitors modifications of the files and records modification-related information in the context of the modified files. Then, the AV driver creates and maintains a log of modified files. The AV driver also supports a cache containing minimal required information about the modified files. One example of a cache that can be used in the exemplary embodiment is a circular cache.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
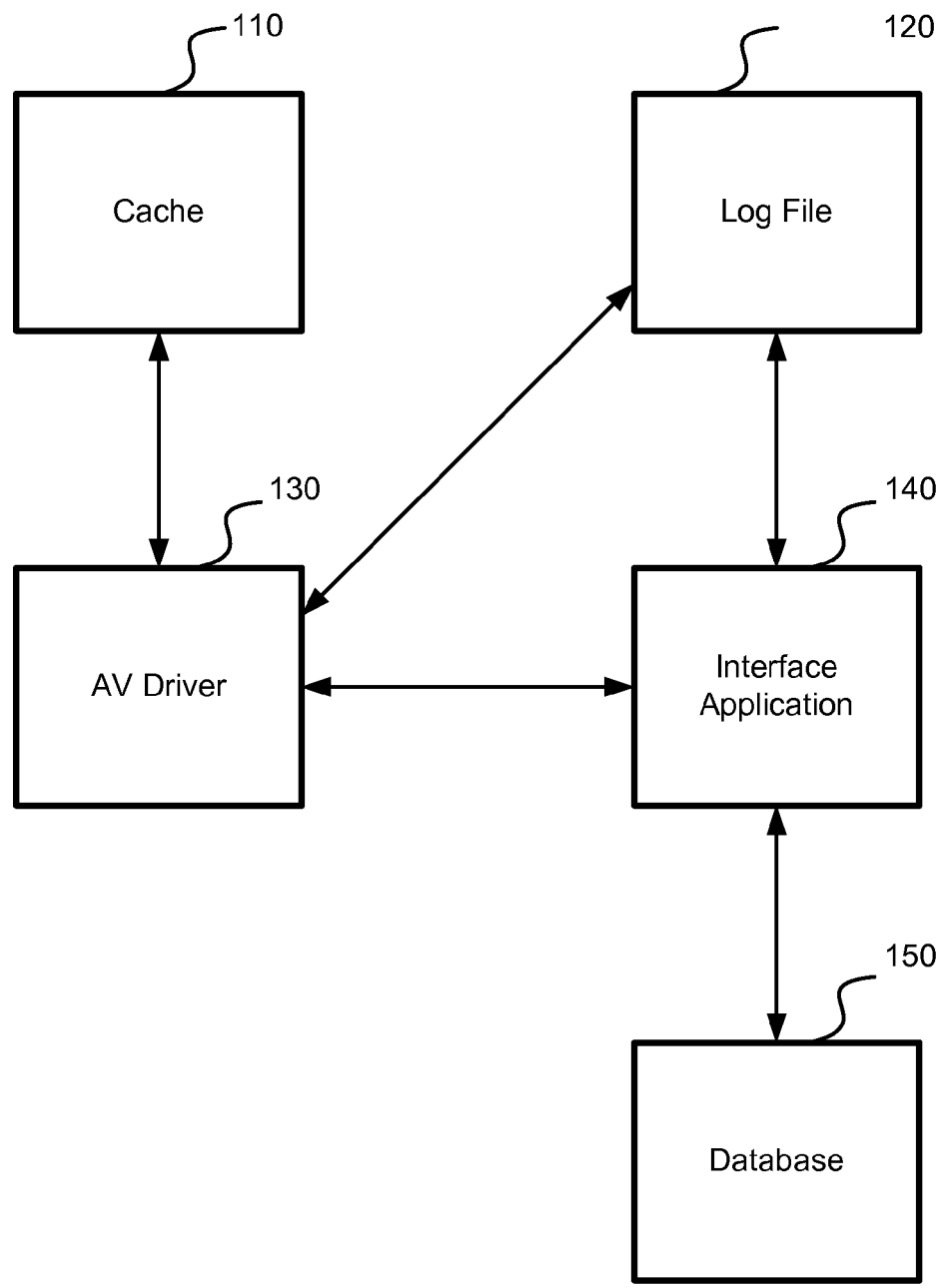
FIG. 1 illustrates a block diagram of a system, in accordance with an exemplary embodiment.

Reference will now be made in detail to the preferred embodiments of the present invention, examples of which are illustrated in the accompanying drawings.

The present invention is intended as a method and system for optimization of anti-virus scanning of a file system. In one aspect of the invention, a system and method for optimizing a process of synchronization of a database of files checked by an anti-virus (AV) application is provided, and is implemented as an AV driver. The database is maintained current by maintaining a log file of the modified files and periodically moving records in the log file to the data base. The database is updated by an interface application using the log file and a cache of the AV driver.

According to the exemplary embodiment, the AV driver monitors modifications of the files and records the modification-related information in the context of the modified file. Then, the AV driver creates and maintains a log of modified files. It also supports a circular cache containing minimal required information about the modified files.

This information is used for identification of the modified files by an application providing an interface between the AV driver and the database of checked files. The cache, in accordance with the exemplary embodiment, has the following structure:

Flags, reflecting a state of the cache (e.g., CacheFlags variable); a current number of non-loaded records in the cache (e.g., CacheEntryCount variable); an offset value, defining where the AV driver can add new records into the cache (e.g., CacheWriteIndex variable); an offset value (e.g., CacheReadIndex variable), defining a location from which the AV driver, upon a request from the interface application, can look for records that have already been placed in the log, but have not yet been recorded in the database of the checked files; a pointer to the memory space, that contains cache records (e.g. CacheBuffer variable); an object for cache operations synchronization (e.g. CacheLock variable); an offset value (e.g., CacheFlushIndex variable), defining a location from which the AV driver can flush records to the log.

The circular cache can be implemented as an array of records, a linked list, a tree list, a plurality of tree lists, etc. The AV driver can add new records into the cache only in the range between the CacheWriteIndex value and the CacheReadIndex value based on a circular nature of the cache. In case of a complete fill up of the cache (i.e., when CacheEntryCount equals to a maximum number of records in the cache), the AV driver marks the cache and the log file as invalid and stops maintaining them.

Then, a dedicated thread of the AV driver periodically transfers all new cache entries into the log file. Note that during this process the records are not deleted from the cache until the interface application reads them into the database from the log file. According to the exemplary embodiment, the log file has a header and a circular data area. The log file header has two parts: one part has a fixed length and another part has a variable length.

In the exemplary embodiment, a fixed length part of the header is used for storing data pertaining to a structure of the log file and serves data required by the AV driver and the interface application. This part of the header has the following fields:

A unique identifier of the log file (e.g. Signature);

A full size of the header (including a variable length part), indicating an offset of the initial point of a data area;

Flags reflecting a state of the log file (e.g. Flags);

A size of a record of the log file (e.g. LogEntryLength);

A location (e.g., LogWriteOffset), from which the AV driver can write new records into the log file from its cache; and In order to optimize reading of the log file header (i.e., not having to read the header each time the log file is accessed), a special control structure connected to the log file is implemented. The control structure has the following fields (some of which duplicate the fields in the log file header):

Flags reflecting a state of the log file;

A location (e.g., LogWriteOffset variable) where the AV driver can add new records into the log file;

A location (e.g., LogReadOffset variable), from where the interface application can read records from the log file for transferring them into the database. As an alternative, a memory mapped file can be used as an optimization, to exchange information regarding the contents of the log file.

The AV driver can write new records into the log file only in the range between the LogWriteOffset value and the LogReadOffset value based on a circular nature of the log file data area. Thus, one can count a current number of records contained in the log file. In case of a complete fill up of the log file (i.e., when the Flags variable reflects this case), the AV driver marks the log file and the cache as invalid and stops maintaining both cache and log file. The AV can then perform an antivirus check on files using conventional methods, without relying on the log file and the cache.

The variable length part of the log file header can be used for various extensions of the proposed system. A dedicated thread of the interface application retracts the records from the log file and transfers them into the database, while the records that have been read from the log file are deleted from the cache.

The interface application can initiate a request to the AV driver to find a particular record in the AV driver cache. During this process, the cache cannot be changed, and, when the cache is flushed out next time, the record is written into the log file. All of the requests from the interface application directed to renewal of the LogReadOffset value in the log file and the CacheReadIndex value in the cache are implemented by calling dedicated AV driver functions.

According to the exemplary embodiment, the AV driver and the interface application work together in order to synchronize the log file and the database. When the system is launched, the AV driver initializes internal control structures and a cache. Then, the AV driver opens the log file. If the log file does not exist, the AV driver creates it.

If the log file was open, the AV driver checks a signature (of the header) and a state of the log file at the time of the last system boot up. If the log file does not pass a signature check, the AV driver turns off its log file maintenance function. If the log file was not closed correctly at the system shut down, the AV driver initializes this log file and marks it as invalid until receiving a request from the interface application that initializes maintenance of the log file.

The interface application, during its initialization, opens the log file and in order to map log file in the memory the interface application creates a memory mapped file (i.e., file system still works with it if it is common file on the disk). After that, maintenance of the log of the modified files will be initiated by the AV driver upon receiving a request from the interface application.

The AV driver, using its function PostWrite (i.e., the AV driver receives a call back after the write to the file indicating that the write has been successful—this is done to avoid clogging up the database with failed writes) marks the file context to indicate that the file has been modified (if the mark has not been already placed) and takes off the mark indicating that the file-related data is recorded in the cache (if such a mark has been placed).

The AV driver, using its function PostCleanup (a notification that the user process closes the handle corresponding to the file), checks the mark indicating modification of the file. If the file was modified, the AV driver forms a record containing minimal required information about the file. In the exemplary embodiment, this information consists of a hash of volume name and an internal ID of the file. Note that this minimal file information can be extended.

Then, the AV driver checks if the corresponding record is present in the cache and if the record is not found, the AV driver writes the record into the cache. The AV driver modifies the values of the CacheWriteIndex and the CacheEntries variables and makes a mark in the context of the file indicating that the file-related data is placed into the cache.

If there is no space in the cache (i.e., CacheEntries value equals to a maximum number of records allowed in the cache), the AV driver invalidates the cache and the log file. Then, the AV driver places the file log maintenance subsystem into a waiting for re-initialization mode. The file log maintenance subsystem waits for a request, from the interface application, for another initiation of the file log maintenance process.

The dedicated AV driver thread periodically checks for new records in the cache. If the new records are found, the dedicated thread analyzes a header of the log file (or a connected structure) and checks how many records can fit into the log file. If the log file is full (i.e., LogFileEntries variable equals to a maximum number of records allowed in the log file), the AV driver invalidates the log file and the cache.

Then, the AV driver places the file log maintenance subsystem into a waiting for re-initialization mode. The file log maintenance subsystem waits for a request, from the interface application, for another initiation of the file log maintenance process. If the log file has available space, the AV driver transfers the record into the log file. Then, the AV driver modifies the value of the LogWriteOffset in the header of the log file.

At a particular point, the dedicated interface application thread checks for new records in the log file. If new records are found, the AV dedicated thread derives, from the header of the log file, a number of records that can be read and reads these records. Subsequently, the dedicated interface application thread sends a request to the AV driver for modification of the LogReadOffset value in the header of the log file and for modification of the CacheReadIndex value, in accordance with the number of records read by the interface application from the log file.

The value of CacheEntries is reduced in corresponding structure. The AV driver flushes new records from the cache and from the log file. Thus, the space is periodically freed up for new records. This operation is executed only by a request from the interface application in order to guarantee that the records have been received by the interface application prior to being flushed out by the AV driver.

When the AV driver receives a request from the interface application for finding a particular record in the cache (for the case when the record is present in the cache, but has not been yet placed in the log file or is being transferred to the log file), the AV driver scans through all records in the cache located in the range from CacheReadIndex to CacheWriteIndex.

If the requested record is found, it is immediately provided to the interface application for further processing. Note that this record is not deleted from the cache. Thus, the CacheReadIndex value is not modified. As discussed above, this record is transferred, by the dedicated driver thread, to the log file.

If the cache has new records (or count of records is more than some threshold value) and the log file has some space available, it means that the dedicated thread of the interface application does not keep up with reading the records from the log file into the database. In this case, the interface application, when requesting a particular record in the cache, receives a special instruction from the AV driver to force reading these records from the log.

The AV driver uses special flags, which are returned after every request from interface application. These flags contain information about states of the cache and the log file. This information can be used by interface application in case when both cache and log file are invalid (so interface application can decide what to do next).

The exemplary embodiment has a number of advantages listed herein. The proposed method does not use any synchronization objects for maintaining the log file. The read and write operations with the log file are synchronized by a Memory Manager. In the exemplary embodiment, the cache is synchronized by a synchronization object that is acquired only when the fields CacheReadIndex, CacheWriteIndex and CacheEntries are modified.

The interface application works with the log file in the same way as it works with a memory buffer. Alternatively, the log file can be mirrored (i.e., mapped) into the memory. The AV driver and the interface applications have dedicated threads that access the log file in the predetermined time intervals.

The AV driver collects information about the modified files in its cache. The operations with cache, advantageously, do not affect the functionality of the threads of the AV driver and the interface application.

FIG. 1 illustrates a block diagram of a system, in accordance with an exemplary embodiment. The system comprises a cache 110, a log file 120 for storing information about file modifications, an AV driver 130, an interface application 140 and a database 150. The AV driver 130 controls the cache 110, the log file 120 and can provide information to the interface application 140. The interface application 140 has access to the database 150 and to the log file 120 and provides an interface between the AV driver 130 and the database 150.

Figure 2:
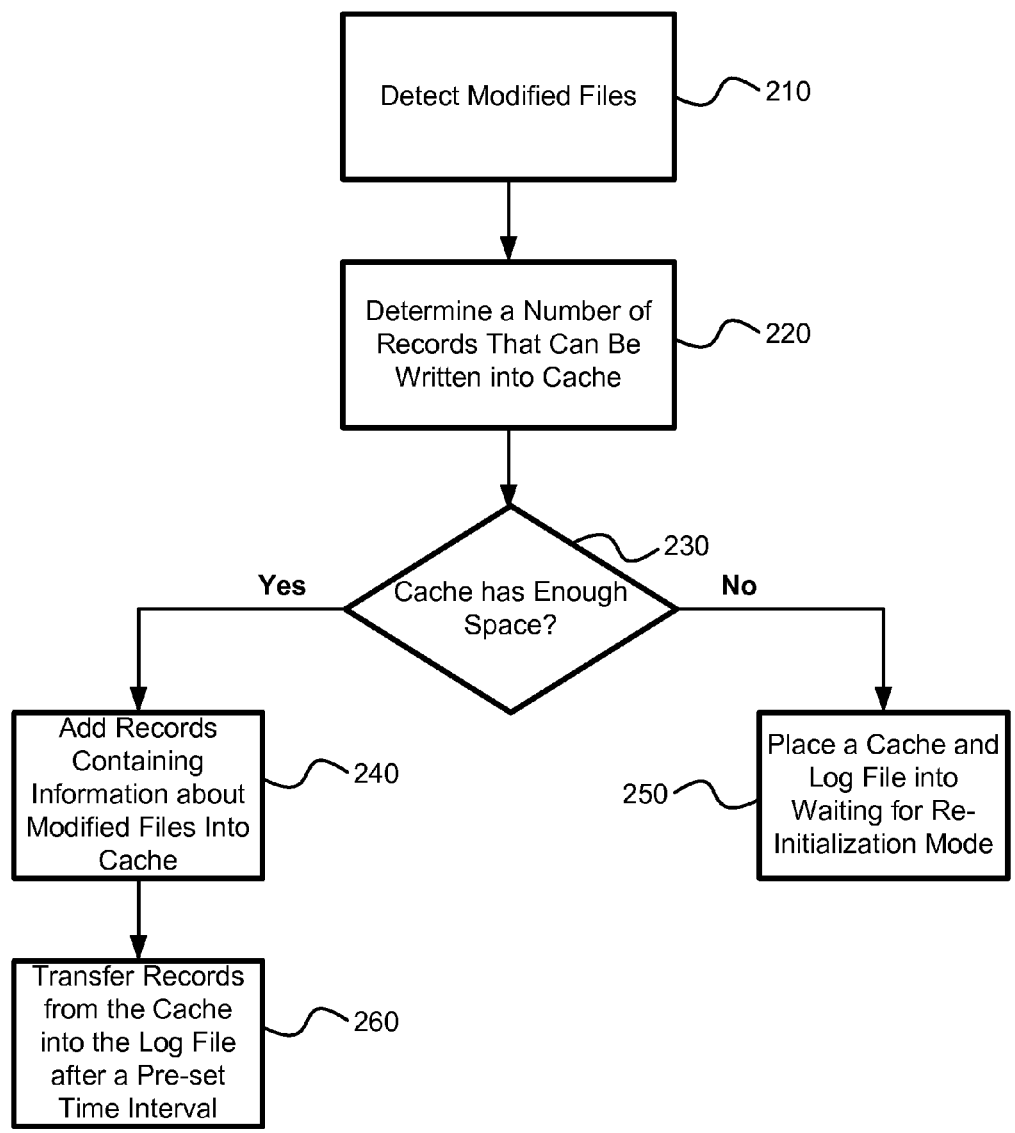
FIG. 2 illustrates a flowchart of a method for adding a record to a cache, in accordance with the exemplary embodiment.

FIG. 2 illustrates a flowchart of a method for adding a record to a cache, in accordance with the exemplary embodiment. The AV driver 130 detects modified files in step 210. Then, the AV driver 130 determines a number of records that can be written into the cache 110 by comparing values of CacheReadIndex against CacheWriteIndex. If these values are equal, the cache 110 is filled up (or empty) at step 220.

A number of available record spaces in the cache is determined as follows:

If CacheWriteIndex<CacheReadIndex, then

CacheFreeRecords=CacheReadIndex−CacheWriteIndex

If CacheWriteIndex>CacheReadIndex, then

CacheFreeRecords=CacheMaxEntries−CacheWriteIndex++CacheReadIndex, where CacheMaxEntries is a maximum number of records that can be written into the cache.

In step 230 it is determined if cache has enough space. If there is enough space, new records containing information about modified files will be added into cache in step 240. After a pre-set time interval new records in the cache are being moved to the log file in step 260.

In case when the cache hasn't enough space AV driver invalidates cache and the log file in step 250 and waits for the interface application.

Figure 3:
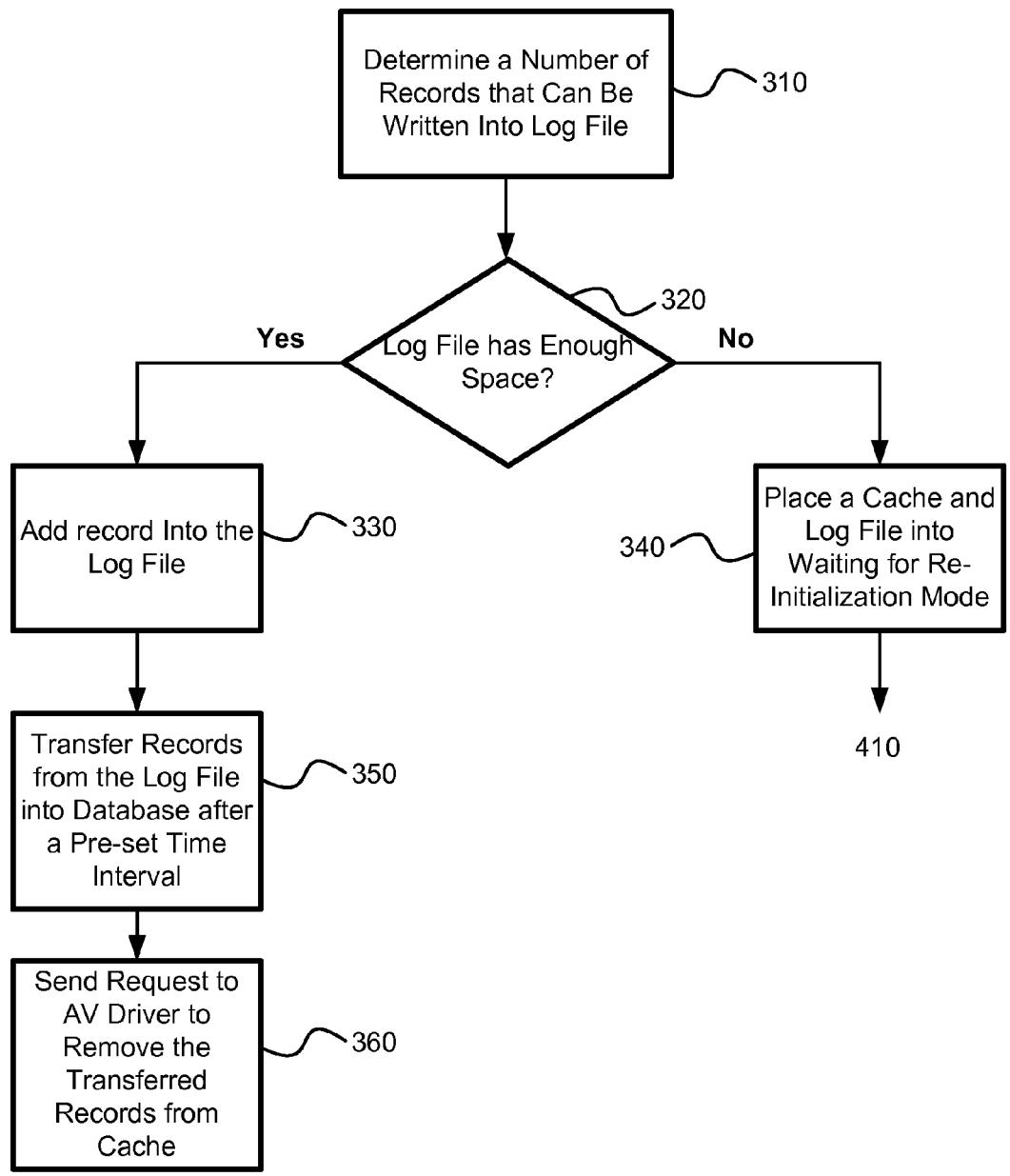
FIG. 3 illustrates a flowchart of a method for transferring a record from a cache to a log file, in accordance with the exemplary embodiment.

FIG. 3 illustrates a flowchart of a method for transferring a record from a cache to a log file, in accordance with the exemplary embodiment. A dedicated thread of the AV driver 130 determines a number of records that can be written into a log file 120 in step 310. Then, in step 320, it is determined if the log file 120 has enough space. If there is not enough space, the log file 120 is placed into waiting for re-initialization mode in step 340.

If the log file 120 has sufficient space, the record is added into the log file 120 in step 330. Then, in step 350, the record is transferred into the database 150 after the expiration of a pre-set time period. Subsequently, in step 360, a request is sent by the interface application 140 to the AV driver 130 to remove the transferred record from the cache 110.

Figure 4:
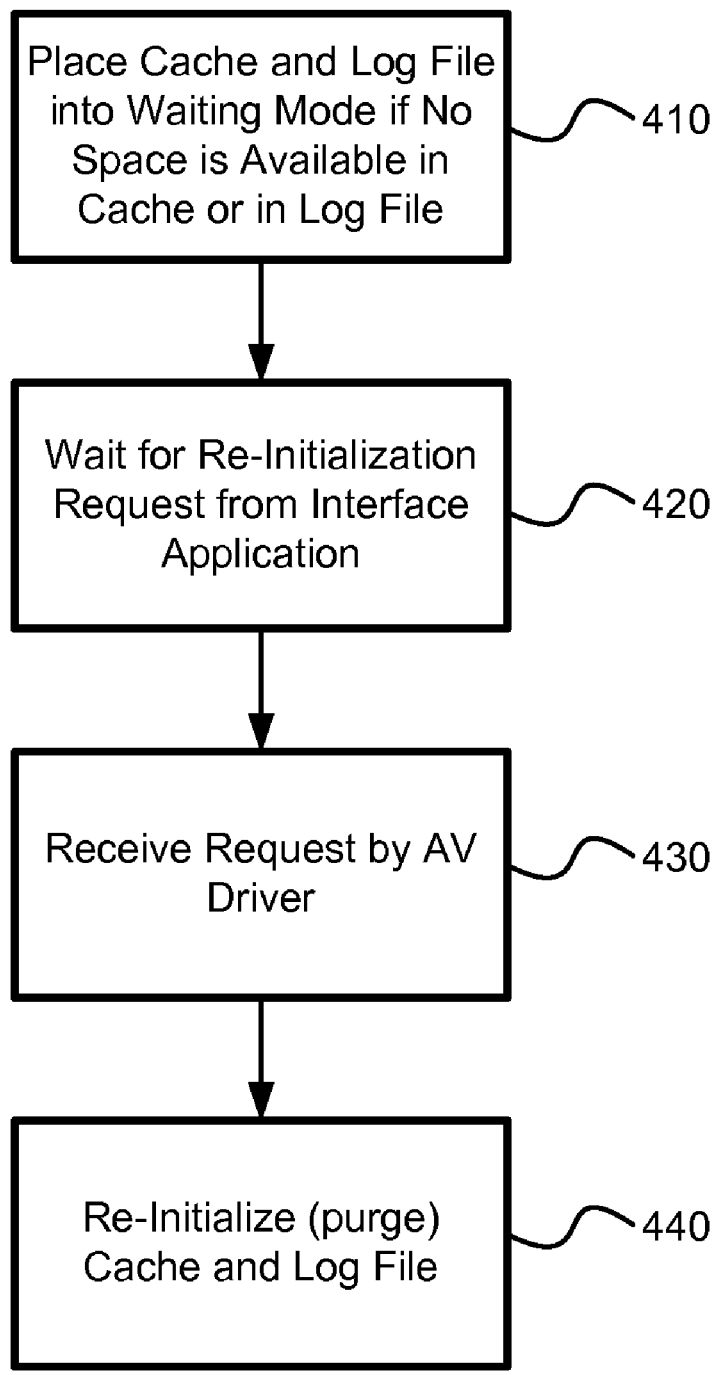
FIG. 4 illustrates a block diagram of a log file in a state of waiting for re-initialization request, in accordance with the exemplary embodiment.

FIG. 4 illustrates a block diagram of the log file 120 in a state of waiting for re-initialization request, in accordance with the exemplary embodiment. As discussed above, if the AV driver 130 determines that the cache 110 does not have any room for new records, the AV driver 130 places the log file 120 into a waiting for re-initialization mode in step 410. The maintenance system of the log file 120 waits for re-initialization request from the interface application 140 (see step 420).

In step 430, the AV driver 130 receives a re-initialization request and cleans up (i.e., purges) the cache 110 and the log file 120 in step 440. It is done as follows:

CacheWriteIndex, CacheReadIndex and CacheFlushIndex are set to be pointed to the beginning (first value) of the cache. CacheEntryCount is set to equal zero. LogReadOffset and LogWriteOffset also point to the beginning of the log file data area.

Figure 5:
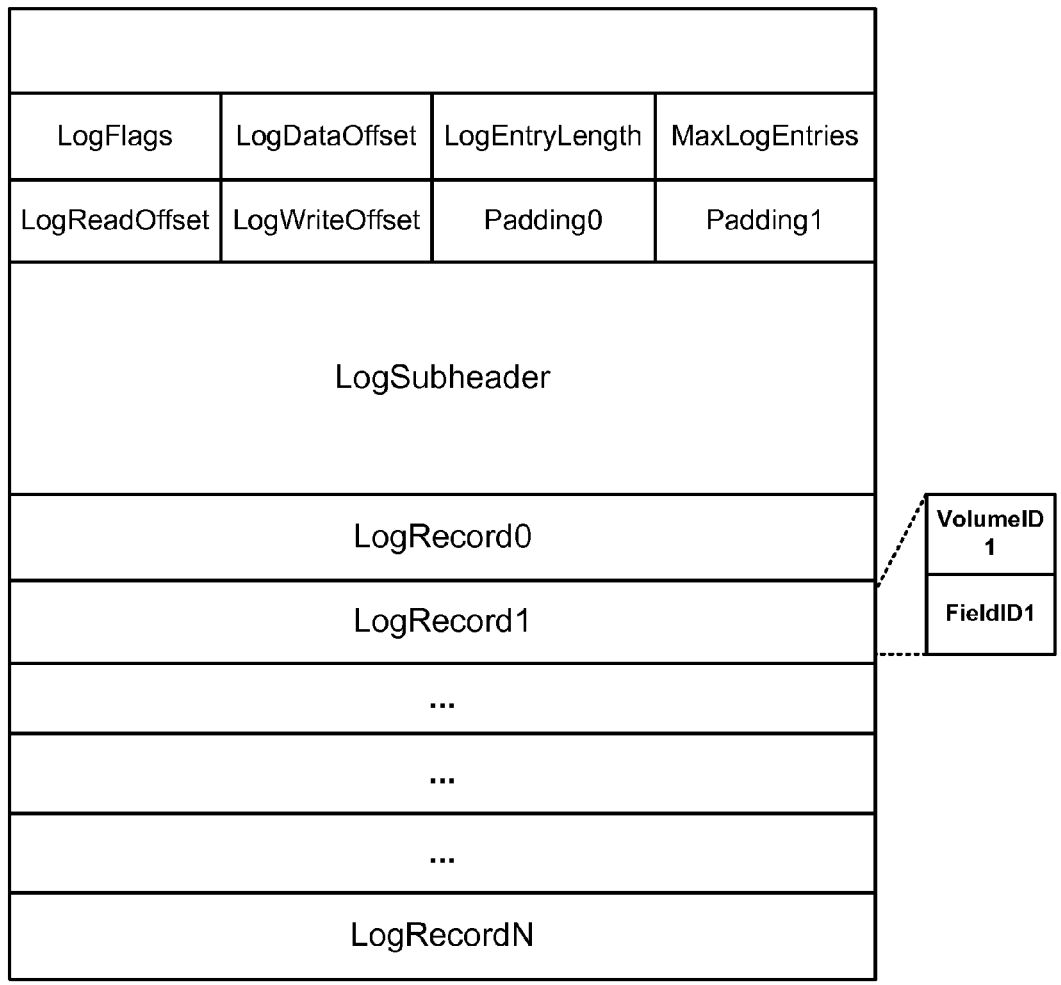
FIG. 5 illustrates a structure of a log file, in accordance with the exemplary embodiment.

FIG. 5 illustrates a structure of a record in a log file, in accordance with the exemplary embodiment. The log file and the cache have the same structure of record consisting of a VolumeID and a FieldID in accordance with the exemplary embodiment. The VolumeID is a unique identifier of the volume where the file is located. The FieldID is a unique identifier of the file.

FIG. 5 also illustrates a structure of a log file, in accordance with the exemplary embodiment. A signature is a unique identifier of the log file (such as, for example, Global Unique Identifier—GUID). The signature can also be used as the log file version identifier. LogFlags reflect a state of the log file. A LogDataOffset variable is an offset value that determines position of the data area in the log file. The LogDataOffset includes a full size of the log file header with its variable length portion. A LogEntryLength variable is a size of the log file record. A MaxLogEntries variable is a maximum number of records allowed in the log file.

A LogReadOffset variable points to a location in the log file, from where the interface application can read records in order to transfer them to the database of checked files. A LogWriteOffset variable points to a location in the log file from where the AV driver can write new records from its cache.

Padding0 and Padding1 are reserved fields used for alignment. LogSubheader is a part of the log file header of variable length. The LogSubheader field is used for storing data connecting volume names and their unique identifiers. LogRecord0-LogRecordN are the log file records containing file-related information. Each of the LogRecords has a structure consisting of a VolumeID and a FieldID (as shown for an exemplary LogRecord1).

Figure 6:
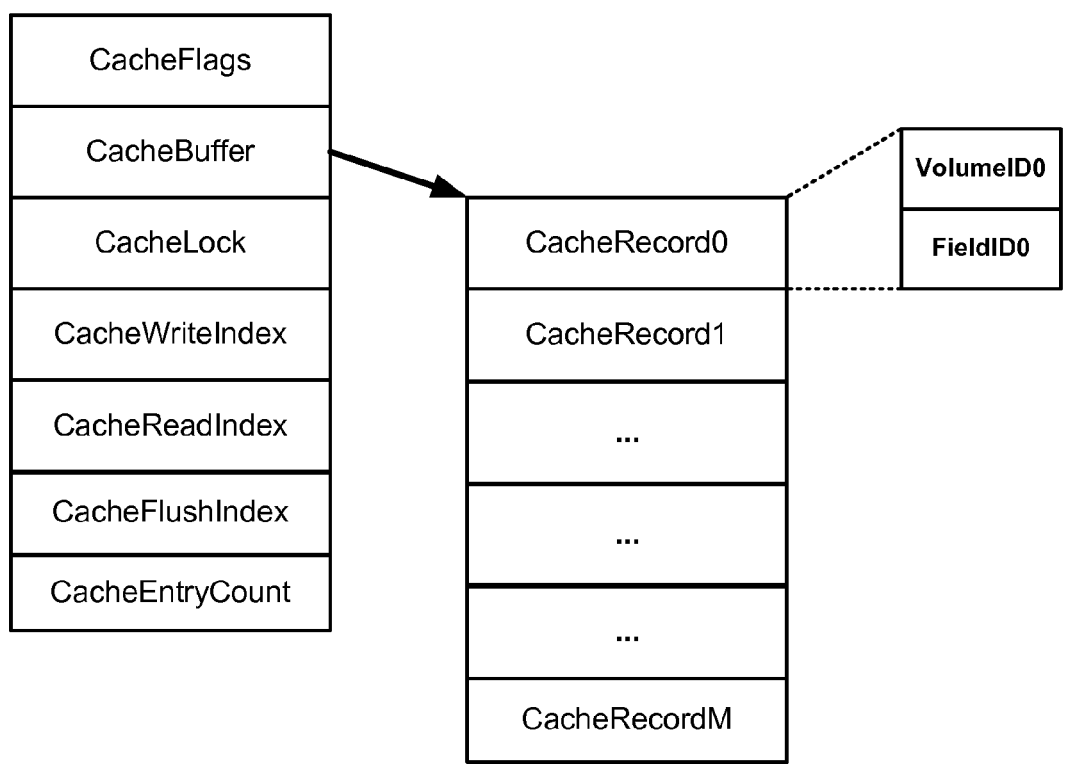
FIG. 6 illustrates a structure of a cache, in accordance with the exemplary embodiment.

FIG. 6 illustrates a cache control structure and a structure of a record in a cache, in accordance with the exemplary embodiment. The cache has a structure that is analogous to the structure of the data area of the log file depicted in FIG. 5. The cache has a control structure that is used for the same purpose as the log file header. The cache control structure is illustrated in FIG. 6. CacheFlags reflect a state of the cache. A CacheBuffer variable points to the memory area where the cache records are located.

A CacheLock is an object used for synchronization of operations performed with a cache. A CacheWriteIndex variable is an index of a record from which the AV driver can write new records into the cache. A CacheReadIndex variable is an index of a cache record from which the AV driver can transfer cache records into the log file.

A CacheFlushIndex variable is an index of a cache record from which the AV driver can read the records for transferring them into the log file. A CacheEntryCount variable indicates a number of unread records in the cache. CacheRecord0-CacheRecordM are cache records containing file-related information. Each of the CacheRecords has a structure consisting of a VolumeID and a FieldID (as shown for an exemplary CacheRecord0).

Figure 7:
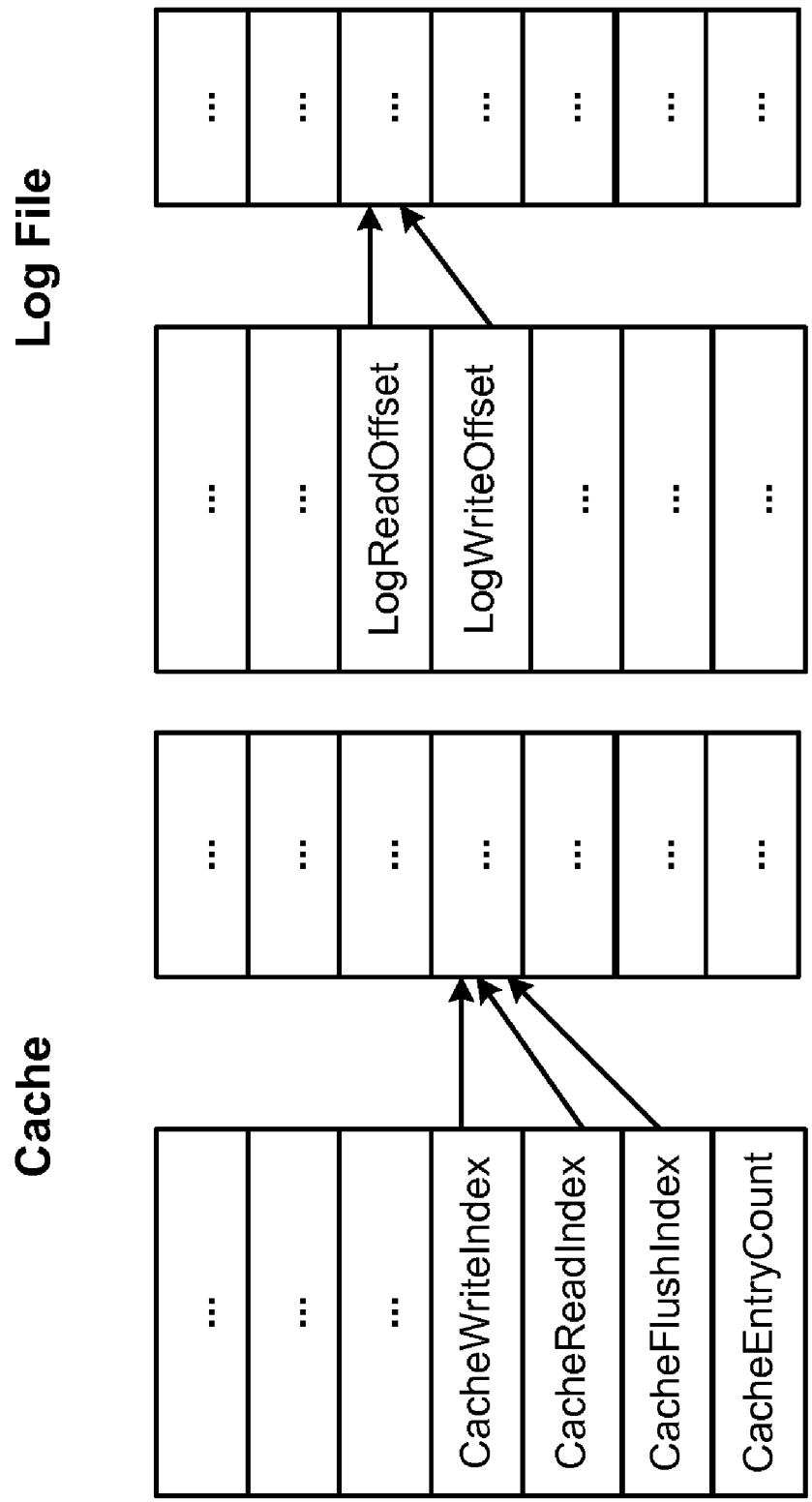
FIG. 7 illustrates a state of an exemplary cache and log file prior to adding a record into them.

FIG. 7 illustrates a state of an exemplary cache and a log file prior to placing a record into the cache. For exemplary purposes, processing of only one record is illustrated. Also, the cache and the log are empty in this example. Thus, the CacheWriteIndex, the CacheReadIndex and the CacheFlushIndex point to the same cache element and the CacheEntryCount equals zero. The LogReadOffset and the LogWriteOffset point to the same record of the log file.

Figure 8:
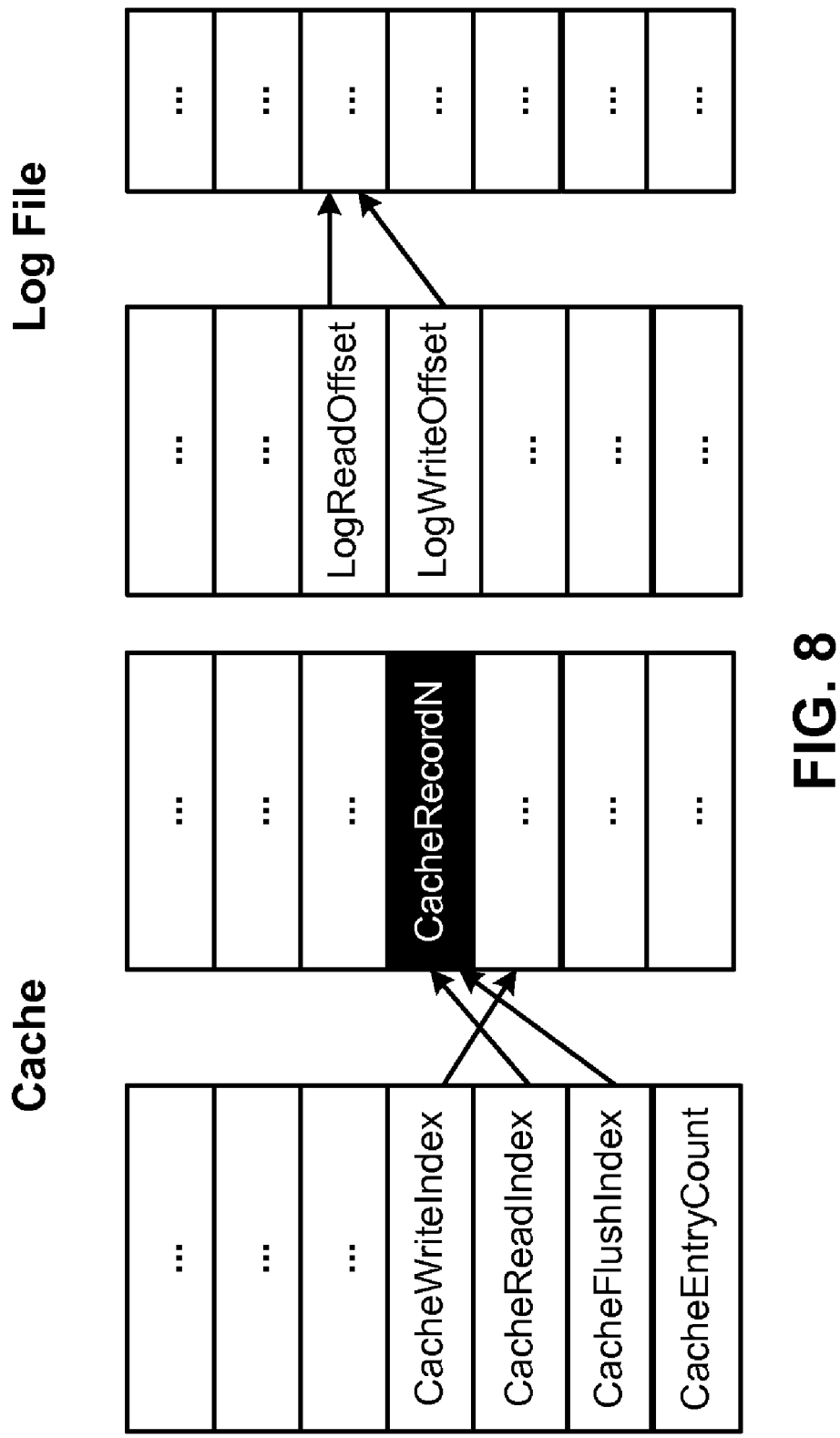
FIG. 8 illustrates a state of an exemplary cache and a log file after a record is added into the cache.

FIG. 8 illustrates a state of an exemplary cache and a log file after a record is placed into the cache. After a record is written into the cache, the value of CacheWriteIndex variable is increased by one (or it can be reduced to zero, if the record is written in the last record space of the cache). The values of CacheReadIndex and CacheFlushIndex remain the same, while the CacheEntryCount value is increased by one. The state of the log file remains the same.

Figure 9:
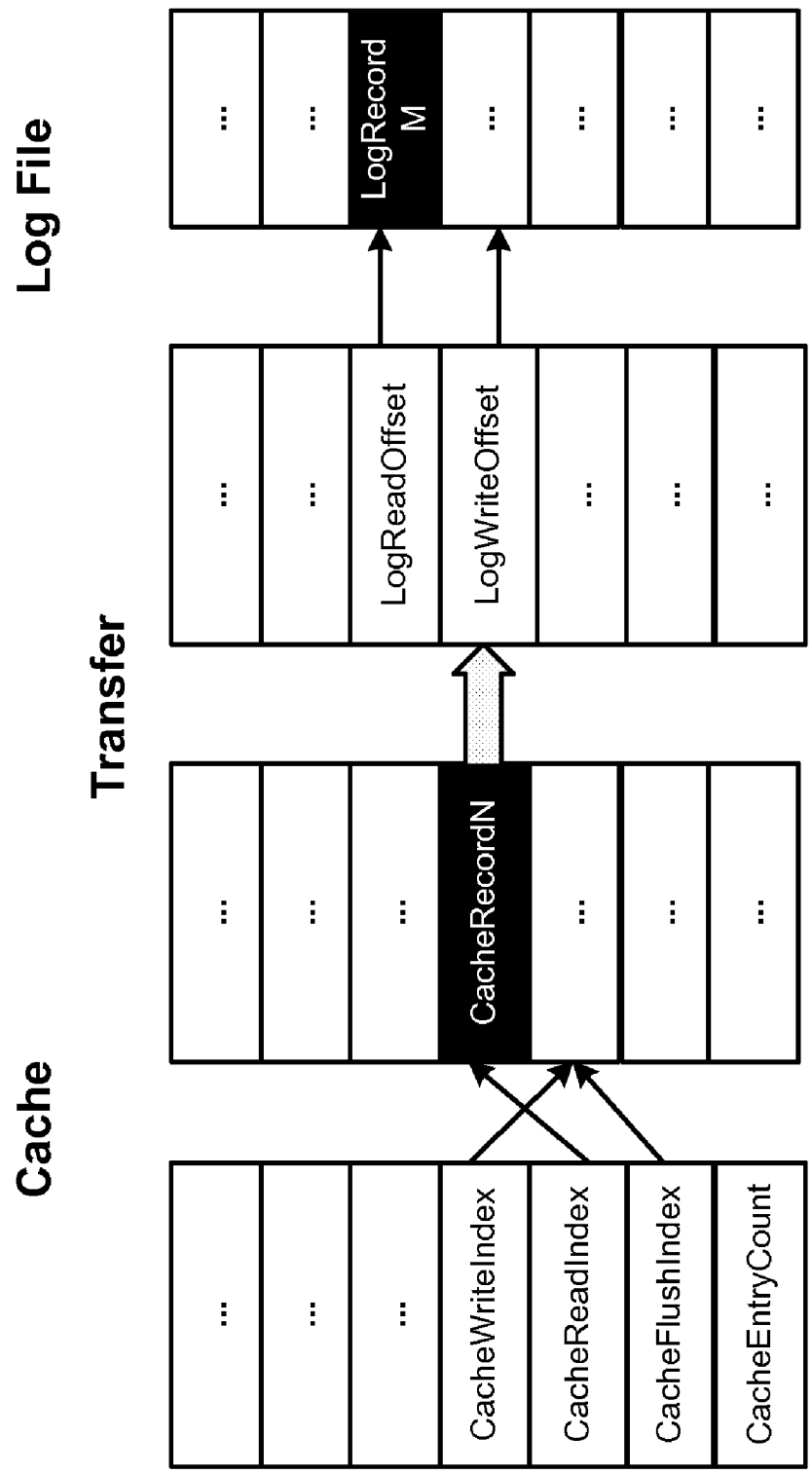
FIG. 9 illustrates a state of an exemplary cache and a log file after a record is transferred from the cache into the log file.

FIG. 9 illustrates a state of an exemplary cache and a log file after a record is transferred into the log file. After the record is retracted out of the cache, the CacheFlushIndex value is increased by one (or reduced to zero, if a record was the last record in the cache). The values of CacheReadIndex, CacheWriteIndex and CacheEntryCount remain the same. After the record is transferred into the log file, the value of LogWriteOffset is increased by the size of the transferred record (or reduced to the initial point of the log file data area, if the record was written into the last record space of the log file). The value of LogReadOffset remains the same.

Figure 10:
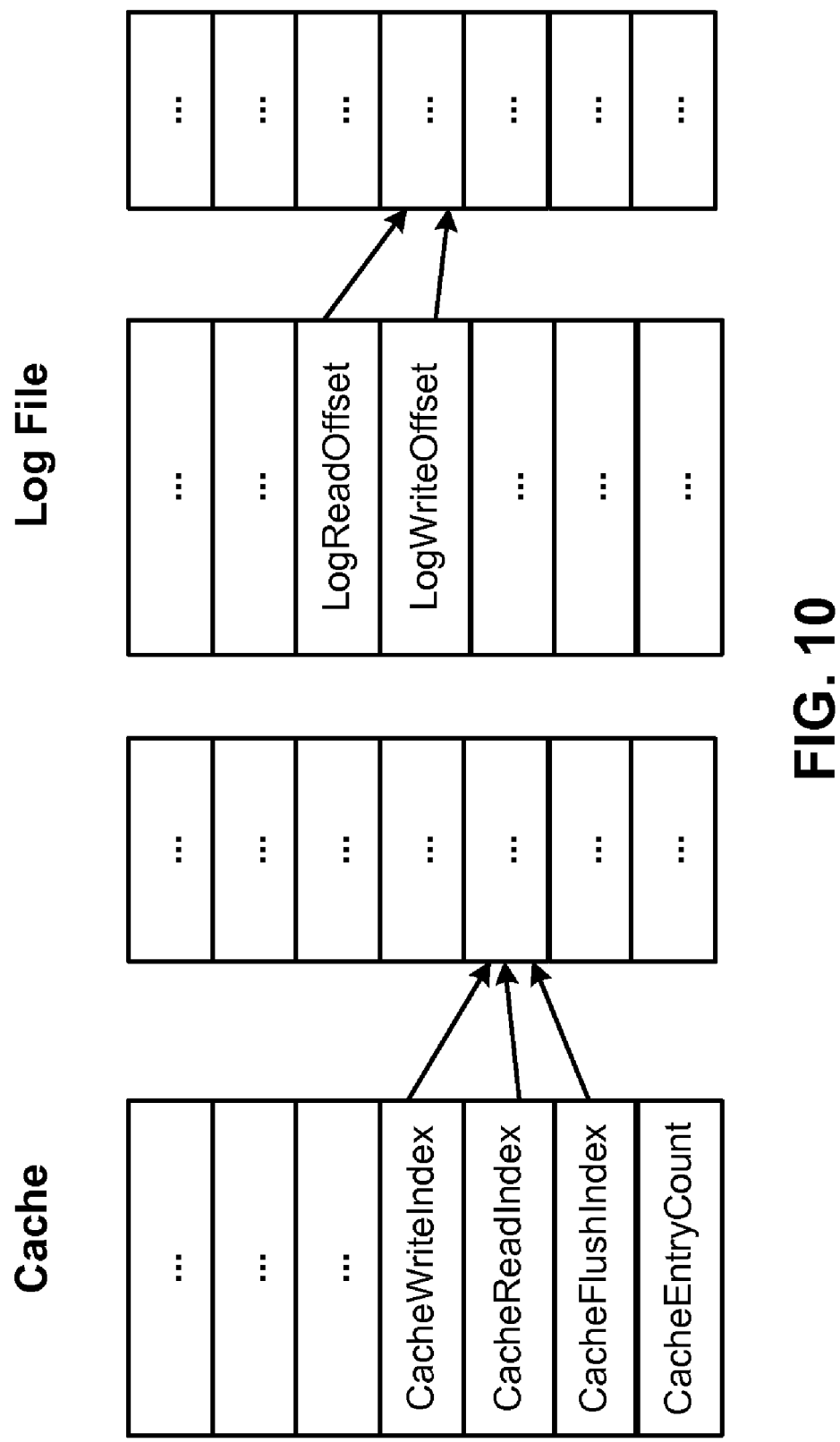
FIG. 10 illustrates a state of an exemplary cache and a log file after a record is retracted from the log file by an interface application.

FIG. 10 illustrates a state of an exemplary cache and a log file after a record is retracted from the log file by the interface application. After the record is retracted from the log file, the LogReadOffset value is increased by LogEntryLength (or drops to the beginning of the log file, if the refracted record was the last record of the log file). The value of LogWriteOffset remains the same.

According to the exemplary embodiment, the cache and the log file have circular structure. Thus, when a new record is added, for example, to the log file (assumptions for the cache have the same nature), two situations are possible:

when LogReadOffset is larger than LogWriteOffset; and when LogReadOffset is smaller than LogWriteOffset.

If these values are equal, that means that a log file is either empty or completely full. For first two situations:

If LogWriteOffset<LogReadOffset then a number of available records in the log file is determined as follows:

$$\text{LogFreeRecords} = (\text{LogReadOffset} - \text{LogWriteoffset}) / \text{LogEntryLength}.$$

If LogWriteOffset>LogReadOffset, then a number of available records in the log file is determined as follows:

LogFreeRecords=(MaxLogEntries*LogEntryLength−LogWriteOffset++LogReadOffset)/LogEntryLength.

Those skilled in the art will appreciate that the preferred embodiment allows reducing a size of the database containing files checked by an anti-virus (AV) application (i.e., an AV driver). The proposed system also, advantageously, allows implementing all database operations in a user mode and reduces the operational overhead caused by an AV driver accesses to the database.

Figure 11:
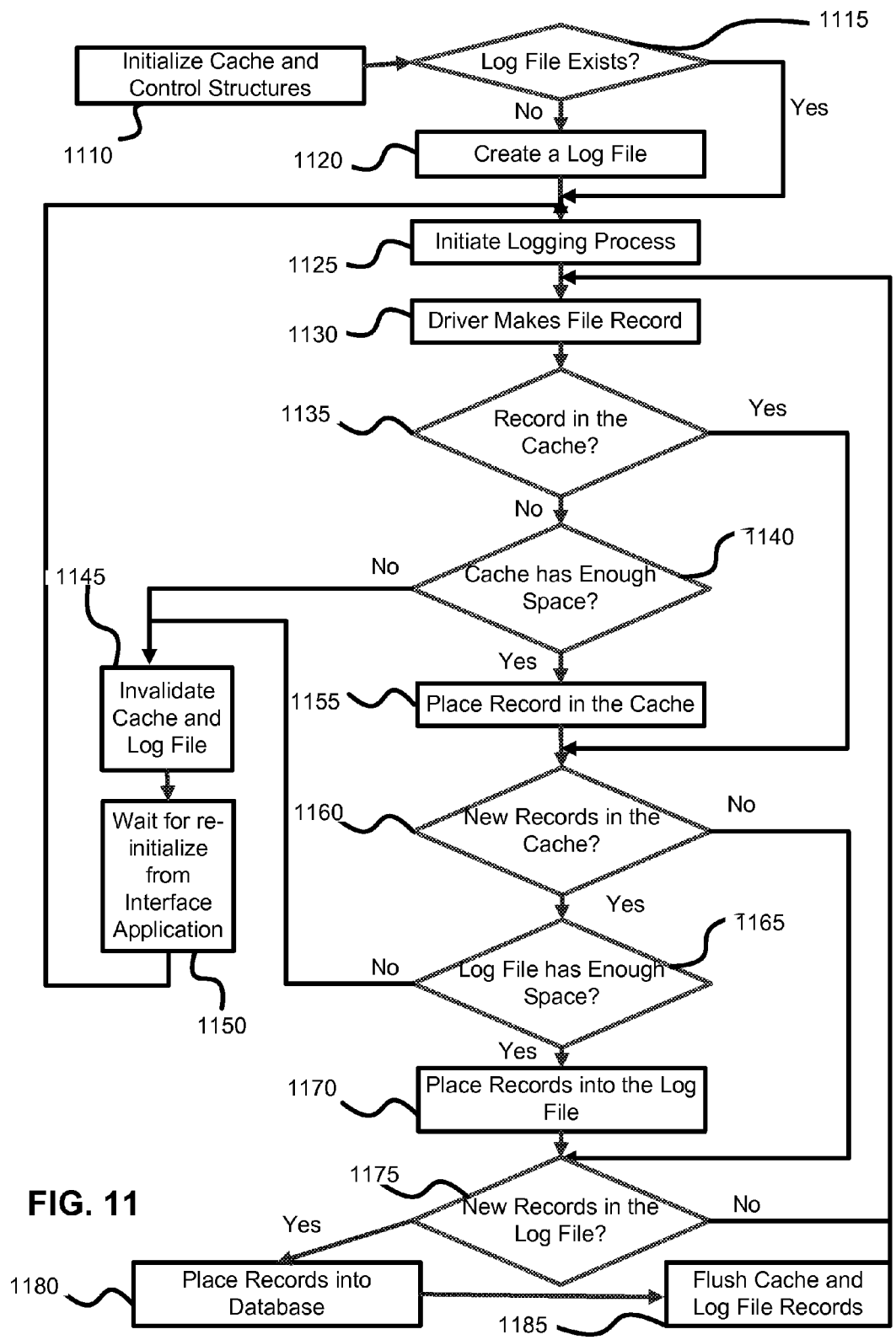
FIG. 11 illustrates a block diagram of a method, in accordance with the exemplary embodiment.

FIG. 11 illustrates a block diagram of a method, in accordance with the exemplary embodiment. An AV cache and control structures are initialized in step 1110. If a log file doesn't exist in the step 1115 then it is created in step 1120. A process of logging modified files is initiated upon a request from an interface application in step 1125.

A modified file is marked by the AV driver and driver generates a file record, containing information about the modified file, in step 1130. Then, the AV driver, in step 1135, searches for the file record in the AV cache and if the file record isn't found then AV driver checks whether there is enough space in the cache, in step 1140. If cache has enough place then AV driver places a mark into a context of the file indicating that the file record is placed into the AV cache in step 1155 else AV driver invalidates cache and log file in step 1145 and put them into waiting state for re-initialization by interface application in step 1150. Periodically AV driver thread checks if there are new records in the cache in step 1160. If new records were found in the cache then AV driver checks whether there is enough space in log file in step 1165. If log file has enough space then AV driver places records into the log file in step 1170, else AV driver invalidates cache and log file in step 1145 and put them into waiting state for re-initialization by interface application in step 1150. Periodically application driver thread checks if log file contains new records in step 1175. If new records in the log file were found then they are placed into the database in step 1180 and flushed in step 1185. After that process continues at step 1130.

Figure 12:
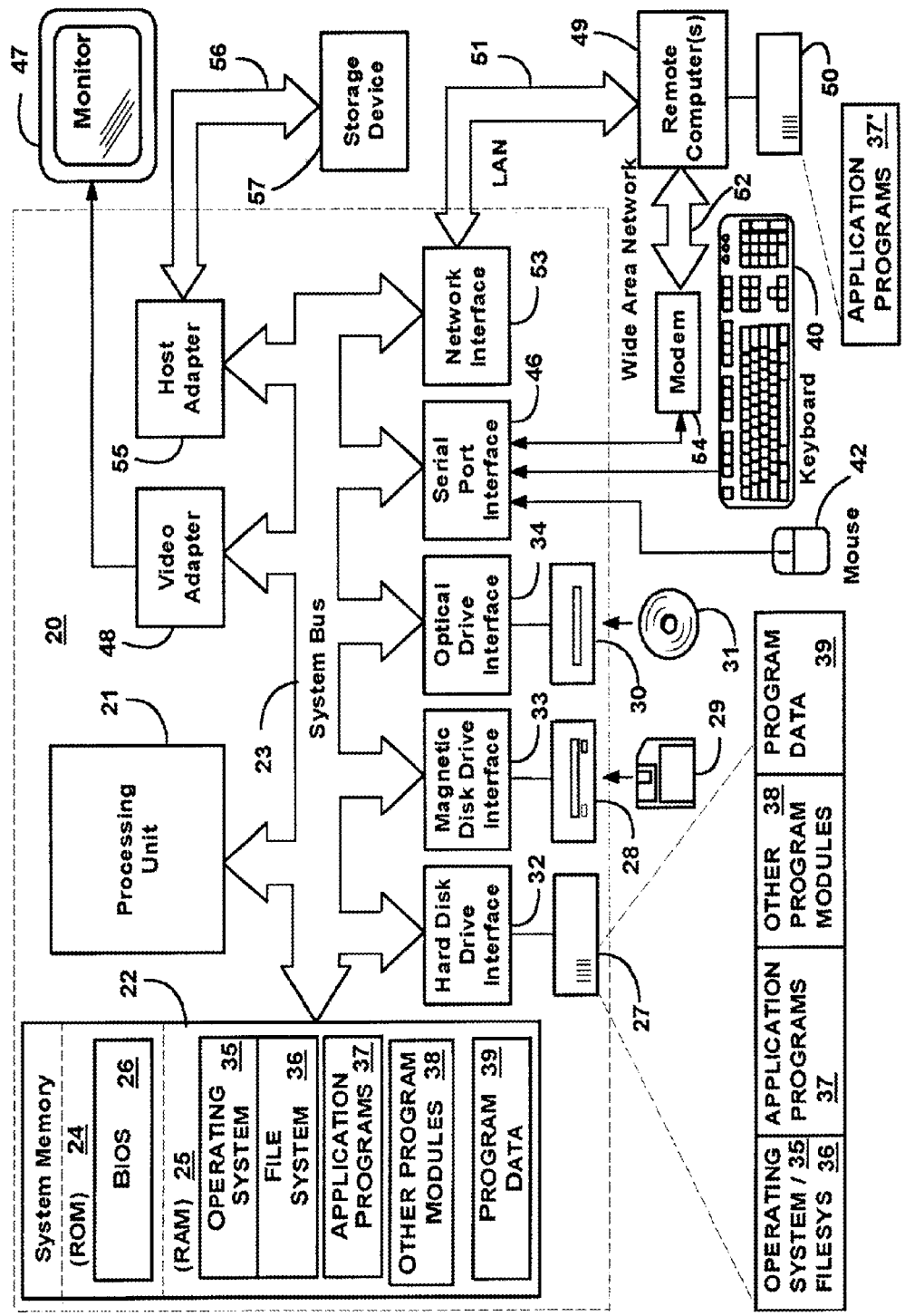
FIG. 12 illustrates a schematic of an exemplary computer system on which the exemplary embodiment can be implemented.

With reference to FIG. 12, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the personal computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method allow reducing an overhead done by AV while checking files.

It should also be appreciated that various modifications, adaptations and alternative embodiments thereof may be made within the scope and spirit of the present invention. The invention is further defined by the following claims.

What is claimed is:

1. A method for optimizing a file system scan by an anti-virus (AV) driver, the method comprising:
- (a) initializing an anti-virus (AV) cache memory;
- (b) generating a file record containing information about a modified file;
- (c) when the file record is a new record, writing the file record into the AV cache memory;
- (d) modifying an index for writing a next cache element and changing a number of elements in the AV cache memory;
- (e) placing, by a hardware processor, a mark into a context of the modified file indicating that the file record is placed into the AV cache memory;
- (f) periodically moving, by the hardware processor, new records in the AV cache memory to a log file;
- (g) periodically moving the new records from the log file, by the hardware processor, to a database; and
- (h) finding the file record in the AV cache memory upon receiving a request for the file record.

2. The method of claim 1, further comprising checking a signature of a log file header, when the log file already exists.

3. The method of claim 2, further comprising turning off a log file maintenance function, when the signature is invalid.

4. The method of claim 1, further comprising creating a memory mapped file of the log file in a computer's random access memory.

5. The method of claim 1, wherein a CacheWriteIndex value defines a location where the AV driver can add the new records into the AV cache memory.

6. The method of claim 1, wherein a CacheEntries value defines a current number of records in the AV cache memory.

7. The method of claim 1, further comprising invalidating the AV cache memory and the log file, when the AV cache memory is filled up.

8. The method of claim 7, further comprising placing a logging process into a waiting mode.

9. The method of claim 1, further comprising checking for the new records in the AV cache memory.

10. The method of claim 9, further comprising determining a number of file record spaces available in the log file.

11. The method of claim 10, wherein the determining is performed by analyzing of the log file header.

12. The method of claim 11, further comprising invalidating the AV cache memory and the log file, when the log file is filled up.

13. The method of claim 1, further comprising flushing the new records from the AV cache memory and the log file after they were moved to the database.

14. A system for optimizing file system scan by an anti-virus (AV) driver, the system comprising:
- a processor;
- a memory coupled to the processor and having stored thereon computer readable instructions for implementing following steps:
  - (a) initializing an anti-virus (AV) cache memory;
  - (b) generating a file record containing information about a modified file;
  - (c) when the file record is a new record, writing the file record into the AV cache memory;
  - (d) modifying an index for writing a next cache element and changing a number of elements in the AV cache memory;
  - (e) placing a mark into a context of the modified file indicating that the file record is placed into the AV cache memory;
  - (f) periodically moving new records in the AV cache memory to a log file;
  - (g) periodically moving the new records from the log file to a database; and
  - (h) finding the file record in the AV cache memory upon receiving a request for the file record.

* * * * *